United States Patent
Greene

(10) Patent No.: US 6,641,010 B2
(45) Date of Patent: Nov. 4, 2003

(54) SHOULDER PLATFORM FOR CAMERA

(76) Inventor: Harold C. Greene, 1101 Dawn Dr., Arlington, TX (US) 76010

( * ) Notice: Subject to any disclaimer, the term of this patent is extended or adjusted under 35 U.S.C. 154(b) by 33 days.

(21) Appl. No.: 10/098,074

(22) Filed: Mar. 14, 2002

(65) Prior Publication Data

US 2003/0173383 A1 Sep. 18, 2003

(51) Int. Cl.⁷ .................................................. A45F 5/00
(52) U.S. Cl. ....................... 224/265; 224/908; 396/420; 352/243
(58) Field of Search ................................ 224/908, 265, 224/266; 396/420–422, 425; 352/243

(56) References Cited

U.S. PATENT DOCUMENTS

| | | |
|---|---|---|
| 2,370,611 A | 2/1945 | Du Mais |
| 2,712,779 A | 7/1955 | Tolcher |
| 2,873,645 A | 2/1959 | Horton |
| 3,266,403 A | 8/1966 | Anderson |
| 3,767,095 A | 10/1973 | Jones |
| 3,900,140 A | 8/1975 | Kelso et al. |
| 3,934,769 A | 1/1976 | Carlson, Jr. |
| 4,083,480 A | 4/1978 | Lee et al. |
| 4,091,975 A | 5/1978 | Russell, Jr. |
| 4,244,500 A | 1/1981 | Fournier |
| 4,561,576 A | 12/1985 | Lowe et al. |
| D289,162 S | 4/1987 | Lisowski |
| 4,752,792 A * | 6/1988 | Keith ........................... 354/82 |
| D302,171 S | 7/1989 | Assell et al. |
| D302,697 S | 8/1989 | Parrish |
| 4,895,286 A | 1/1990 | DeRosa |
| 4,963,904 A | 10/1990 | Lee |
| 4,991,758 A | 2/1991 | Eaneff |
| 5,073,788 A * | 12/1991 | Lingwall ....................... 354/81 |
| D323,181 S | 1/1992 | Puskas et al. |
| D324,874 S | 3/1992 | Kardach |
| 5,098,182 A * | 3/1992 | Brown ........................ 352/243 |
| D329,449 S * | 9/1992 | Brown et al. .............. D16/243 |
| 5,229,798 A | 7/1993 | Brown |
| 5,513,784 A | 5/1996 | Pretorius |
| D376,611 S | 12/1996 | Field |
| 5,612,756 A | 3/1997 | Kardach |
| 5,787,317 A | 7/1998 | Robinson, Sr. |
| 5,829,652 A * | 11/1998 | Denzer et al. .............. 224/270 |
| D407,733 S * | 4/1999 | Fukushima ................ D16/243 |

* cited by examiner

Primary Examiner—Sue A. Weaver
(74) Attorney, Agent, or Firm—Lynn E. Barber

(57) ABSTRACT

A shoulder platform that is well-balanced and stable on an operator's shoulder when the camera is mounted on the platform, allowing hands-free balance of the mounted camera. The shoulder platform has an elongated bent frame, a shoulder mount affixed below the frame, a compartment front mounted on the frame above the shoulder mount, two sides mounted above and along the sides of the frame, shelves, storage compartments for camera components and accessories, a latch mechanism, an elongated compartment attached to the lowest shelf that can be latched to the latch mechanism, and means so that the supported camera mounted on the camera mount piece may be placed in different positions for photographing subject matter while keeping the shoulder platform stationary on the operator's shoulder.

8 Claims, 9 Drawing Sheets

SHOULDER PLATFORM FOR CAMERA

BACKGROUND OF THE INVENTION

1. Field of the Invention

This invention relates to devices for carrying cameras, and in particular, pertains to shoulder supports for video cameras.

2. Description of the Related Art

Because many types of still and video cameras are bulky and/or heavy, a wide variety of shoulder rests and supports have been devised to assist in carrying such cameras. Professional video cameras, used for filming in such diverse settings as weddings and sports events, are often particularly unwieldy and have numerous accessories that must be carried by the photographer. In addition, video photographers often need to adjust the shooting angle of the camera, by tilting it up or down or sideways, which can be difficult to do when the camera is affixed to a support.

Many of the prior camera supports have a support piece that is shaped to fit the shape of the user's shoulder (for example, U.S. Patent Des. Pat. Nos. 289,162 of Lisowski; 323,181 of Puskas et al.; 302,697 of Parrish; and 302,171 of Assel et al.; and U.S. Pat. Nos. 2,873,645 and 4,895,286 of DeRosa). Some of the camera supports have additional hand-holds or other support mechanisms to steady or support the camera (for example, U.S. Des. Pat. Nos. 324,874 of Kardach; 376,611 of Field; and U.S. Pat. Nos. 2,370,611 of DuMais; 4,963,904 of Lee; 4,091,975 of Russell, Jr.; 4,244,500 of Fournier). Others have the camera mounted substantially ahead of the support piece with a hand-hold on the portion of the support beneath the camera (for example, U.S. Pat. Nos. 2,712,779 of Tolcher; 3,767,095 of Jones; 4,083,480 of Lee et al.; 5,612,756 of Kardach; and 5,513,784 of Pretorius). Padding has been used on a number of prior camera supports (for example, U.S. Pat. Nos. 3,934,769 of Carlson, Jr.; 4,083,480 of Lee et al.; and 4,991,758 of Eaneff, as well as some of the other patents cited above). The patent of Kelso et al. (U.S. Pat. No. 3,900,140) has a cantilevered arm that rotatably secures the camera unit to a back support, while the patent of Eaneff (U.S. Pat. No. 4,991,758) has a strap arrangement that transfers part of the load from the shoulder bearing the camera to the other shoulder and the support of Robinson, Sr. (U.S. Pat. No. 5,787,317) includes a shoulder harness with spaced-apart shoulder supports.

The supports disclosed by the above-referenced patents are generally quite complicated structures, and are not well-balanced or sufficiently comfortably worn to allow long periods of use. Many of the prior supports do not provide means for adjusting the device for different wearers. In addition, little or no storage capability for camera accessories is found in the prior supports.

It is therefore an object of the invention to provide a shoulder platform for a camera that is balanced for comfortable use and is adjustable to fit on the shoulder of particular wearers. It is a further object of the invention to provide a shoulder platform for a camera that has storage capability for a number of different camera accessories and for film.

Other objects and advantages will be more fully apparent from the following disclosure and appended claims.

SUMMARY OF THE INVENTION

The invention herein is a shoulder platform that is well-balanced and stable on an operator's shoulder when the camera is mounted on the platform, allowing hands-free balance of the mounted camera. The shoulder platform has an elongated bent frame, a shoulder mount affixed below the frame, a compartment front mounted on the frame above the shoulder mount, two sides mounted above and along the sides of the frame, shelves, storage compartments for camera components and accessories, a latch mechanism, an elongated compartment attached to the lowest shelf that can be latched to the latch mechanism, and means so that the supported camera mounted on the camera mount piece may be placed in different positions for photographing subject matter while keeping the shoulder platform stationary on the operator's shoulder.

Other objects and features of the inventions will be more fully apparent from the following disclosure and appended claims.

DETAILED DESCRIPTION OF THE INVENTION AND PREFERRED EMBODIMENTS THEREOF

Figure 1:
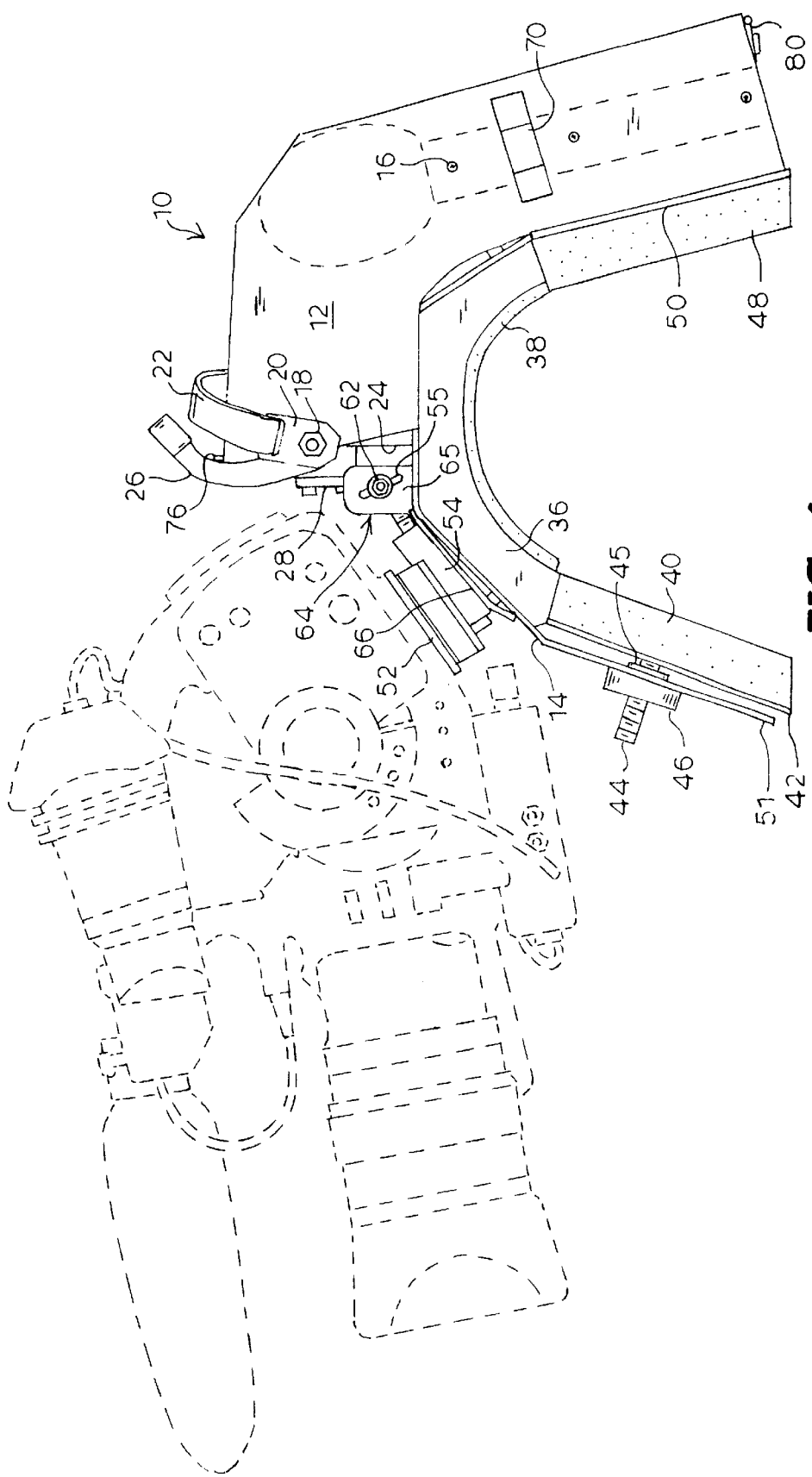
FIG. 1 is a left elevational view of the shoulder platform according to the invention herein mounted on the right shoulder of a person, showing a camera (dashed lines) mounted on the platform.

The present invention is a shoulder platform for supporting a camera. The shoulder platform is well-balanced and stable on an operator's shoulder when the camera is mounted on the platform, allowing hands-free balance of the mounted camera. In the preferred embodiment, the shoulder platform is specifically designed to support a particular video camera, the Canon XL-1™; however, adjustments in the preferred embodiment may be made for mounting other generally similarly shaped cameras with which quick-release plates may be used. The invention features a comfortable padded shoulder platform to which the quick-release plate of the camera may be attached, and which has a plurality of ways to adjust the mounted camera's position on the platform, the capability of being adjusted for shoulders of different operators, and storage capability for camera accessories.

The structure of the invention, which includes having a large portion of the platform that is over the operator's shoulder and behind the shoulder to counterbalance the weight of the mounted camera, optimizes balance of the structure when the camera is mounted on the platform. Prior versions of this invention during its development, that did not provide the weight distribution of the present invention, were not as balanced and were less comfortable in use. The shoulder platform in the preferred embodiment described herein is so well-balanced and stable when the camera is mounted on it, that the mounted camera rests in complete balance on the shoulder, and can remain there without requiring the operator to hold or steady the platform or camera, even while the operator is walking.

The shoulder platform of the invention includes an elongated bent frame having sides and extending from a back support portion to a lower front end. The frame has a back shoulder pad mounted on the back support portion and a front shoulder pad adjustably mounted at the lower front end. There is a shoulder mount affixed to the lower side of the frame between the back support portion and lower front end, which has a shoulder brace cushion pad affixed below the shoulder mount. A compartment front is mounted on the frame above the shoulder mount. Two sides are mounted above and along the sides of the frame. A plurality of shelves is mounted between the sides, which together with the frame and compartment front form a plurality of storage compartments. A latch mechanism is mounted on the compartment front, and an elongated compartment door that is hingedly attached to a lowest shelf has an upper latch catch so that the upper latch catch may be releasably latched to the latch mechanism. A camera mount piece is attached to the frame so that the supported camera mounted on the camera mount piece may be placed in a plurality of positions for photographing subject matter.

As used herein, the terms "left" and "right", when used in reference to the shoulder platform and components thereof, mean the left and right side, respectively, of the shoulder platform, from the perspective of the person using the shoulder platform. The terms "front" and "back" of the shoulder platform and components thereof, and related terms, refer to the portion of the shoulder platform located toward an area in front, or in back, respectively, of the person using the shoulder platform. The terms "upper" and "lower" of the shoulder platform and components thereof, and related terms, refer to the portion of the shoulder platform or component that is located above or at the top of, or below or at the bottom of, respectively, of the shoulder platform.

Figure 2:
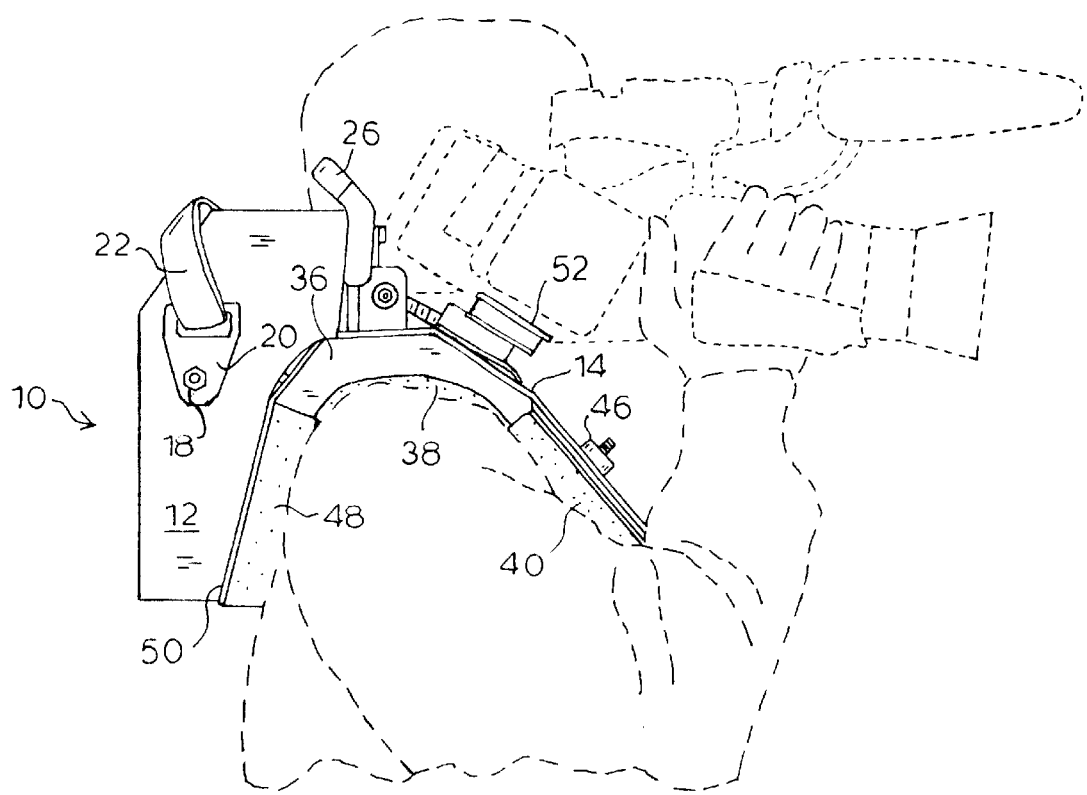
FIG. 2 is a right elevational view of the right side of the shoulder platform of the invention herein mounted on the right shoulder of a person, showing a camera (dashed lines) mounted on the platform.
Figure 3:
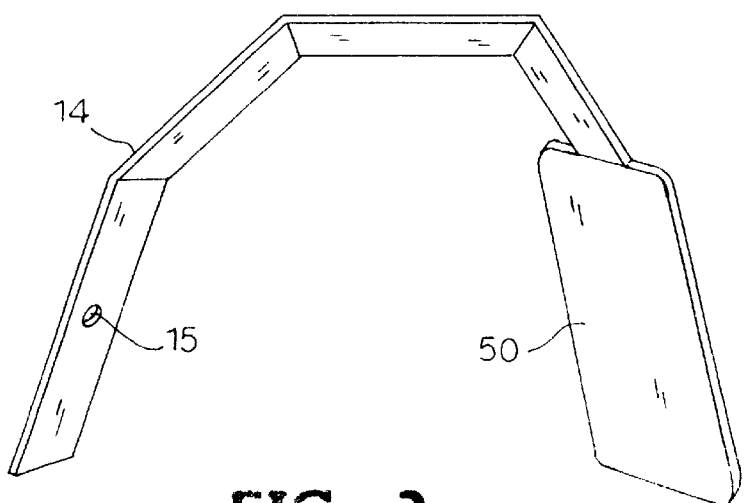
FIG. 3 is a lower perspective view of the multiply bent frame used in the shoulder platform of the invention.

Referring in greater detail to the Figures, FIGS. 1–2 show an overall side view of the shoulder platform 10 of the invention having the preferred video camera mounted thereon (shown in dashed lines). The shoulder platform is assembled on a multiply-bent frame 14 (FIG. 3), preferably made of aluminum. Frame 14 preferably has four slight bends as shown so that the overall shape is generally curved and larger than a potential user's shoulder. In the preferred embodiment frame 14 is about 5 cm wide and about 50.5 cm long, having five segments defined by the four slight bends, with there being two forward segments, two rearward segments and a horizontal central segment as shown. The four slight bends are at about 12.5 cm, 7.5 cm, 11 cm, 6 cm, and 13.5 cm from the front of frame 14. Thus, typically, once the bends are made, the angles of the bends result in there being a straight-line distance of about 27 cm between the two ends of the frame 14, i.e., between the lower edge of back support portion 50 of bent frame and the lower front edge of the front end 51 of bent frame (the part which is to be positioned on the front of the person). It is preferred that there are multiple bends in frame 14, rather than having a smooth rounded curve, so that the various other components of the platform that are mounted on the platform have a flat surface upon which to be mounted. At the end of frame 14 which is to be positioned at the back of the person, frame 14 has a flat back support portion 50 that is preferably about 13 cm high and about 10 cm wide as shown in FIG. 3. There is a hole 15 in frame 14, preferably located in the center of back support portion 50 as shown in FIG. 3.

Between the two ends of frame 14, approximately midway along frame 14 and extending from the first bend at about 12.5 cm from the front of the frame 14 to the back support portion 50, a formed shoulder mount 36 as shown in FIG. 1 is affixed to frame 14 by means of four drywall screws and a bonding agent. Preferably, formed shoulder mount 36 extends from a position about 13 cm from the front edge of frame 14 to a position about 12.5 cm from the lower end of back support portion 50. The upper shape of formed shoulder mount 36 fits within the angles of the frame 14 as shown, and is gently and smoothly curved on its lower surface. Shoulder mount 36 varies in thickness is along its location as shown, but generally it is roughly about 2 cm thick. In the central portion of the shoulder mount 36, the thickness of the shoulder mount is greater on the right side of the shoulder platform than on the left side of the shoulder platform (see, for example, FIG. 4 as compared to FIG. 5 at the location of the "x" and arrows) so that there is a taper of about six degrees downward to conform to the shaped angle of the shoulder. Thus, when the assembled shoulder platform is placed on an operator's shoulder, the shoulder platform is upright on the operator's shoulder and does not tilt outward.

Figure 5:
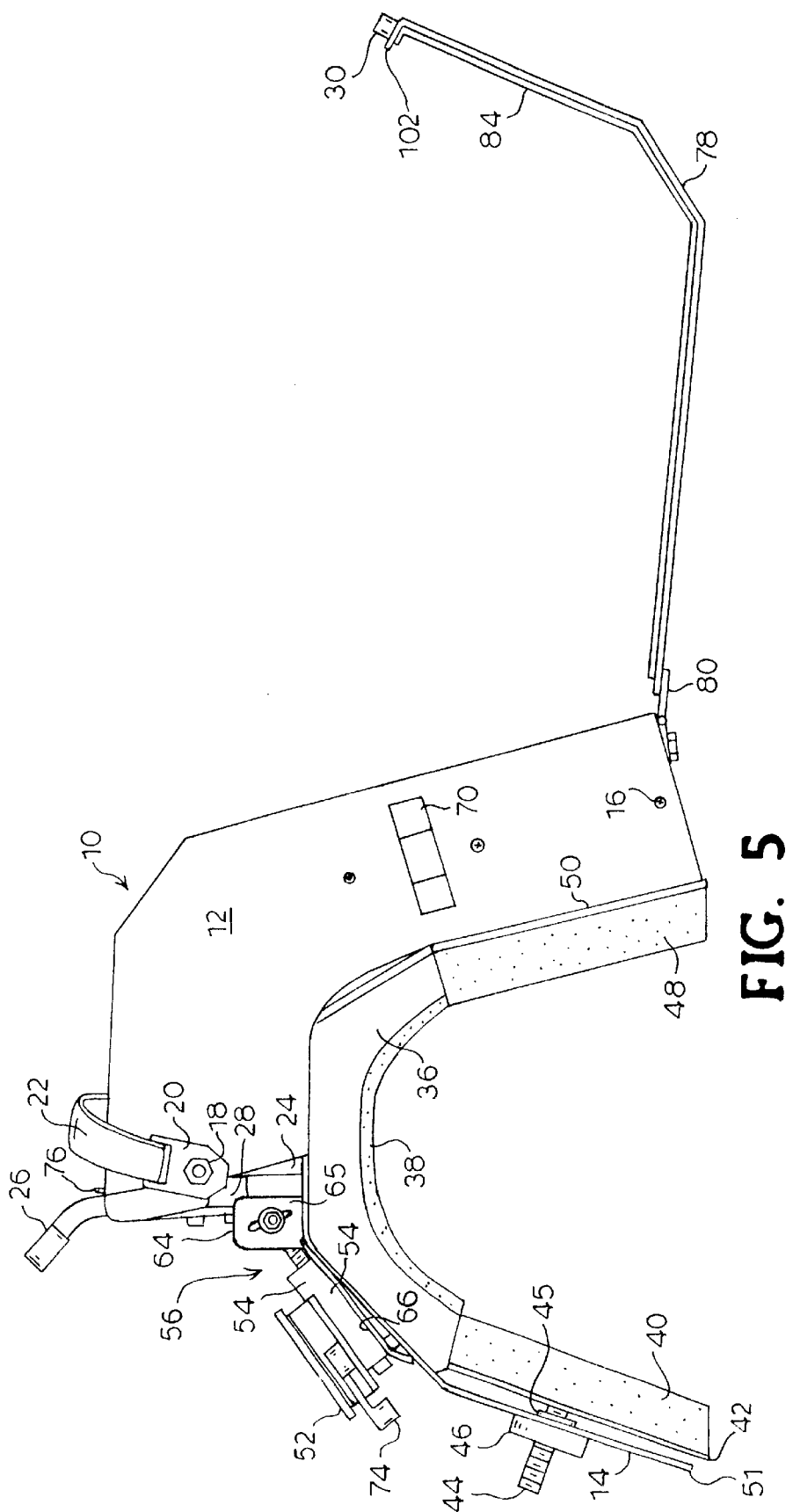
FIG. 5 is a left side elevational view of the shoulder platform showing the compartment door open.

At the front end of shoulder mount 36, chest support plate 42, preferably a plate made of aluminum having a width of about 11 cm and a height of about 12.5 cm, is attached to frame 14 as shown in FIGS. 1 and 5, by means of adjuster stud 44, c-clip (or retaining ring) 45 and plate adjuster 46. Adjuster stud 44 extends through hole 15 in frame 14, with the end of stud 44 resting against chest support plate 42. Turning plate adjuster 46 causes chest support plate 42 to move farther away from or closer to the front end 51 of frame 14.

Figure 13:
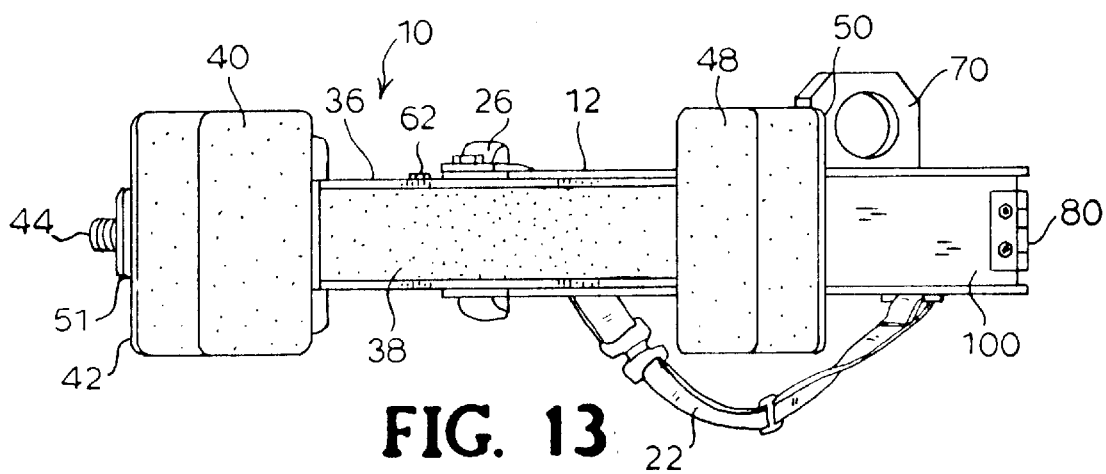
FIG. 13 is a lower plan view of the shoulder mount platform of the invention

A thin foam shoulder brace cushion pad 38, preferably about 0.5 cm thick and extending the length of the lower surface of formed shoulder mount 36, which is about 15 cm long, is glued to the lower surface of the formed shoulder mount 36 (FIG. 13). A thick (preferably about 2.5 cm thick), back shoulder pad 48, preferably made of a sturdy but slightly compressible foam as is known in the art, is affixed to the entire front surface of back support portion 50 by means of an adhesive, such as a peel-off sticky back or an adhesive such as SUPER 77™(Minnesota Mining and Manufacturing). A front shoulder pad 40, preferably the size of chest shoulder plate 42 and about 2.5 cm thick, is similarly attached to a chest support plate 42. Moving chest support plate 42 as discussed above thus also causes front shoulder pad 40 to move either inward toward back shoulder pad 48 of shoulder platform 10 so that shoulder platform 10 fits more snugly on a narrower shoulder, or outward away from back shoulder pad 48, as appropriate for a larger shoulder.

Compartment front 24, preferably made of a rectangular piece of ultra high molecular weight plastic (UHMW) composite plastic, such as delron, about 7.5×9.5 cm, and is affixed to the central segment of frame 14, by means of flathead screws, in a position generally perpendicular to frame 14 and roughly in the center of the central section of frame 14 as shown in FIG. 1.

There are two sides 12 of the shoulder platform 10, which are shaped to fit above and over the back of the frame 14 and are curved or gently angled along their upper edge, preferably as shown in FIG. 1. Preferably sides 12 are made of thin sheets of aluminum. Preferably each side 12 is about 7.5 cm wide at its lower edge and about 10 cm high at its upper edge. Sides 12 do not touch the formed shoulder mount 36. Instead, sides 12 are mounted on the compartment front 24 and the back support portion 50 so there is a gap of about a cm between the lower edge of each side 12 and the shoulder mount 36. This allows air to circulate around the batteries placed in the compartments (stacked charged batteries in the compartments might otherwise heat up and pose problems), and allows many different accessories to fit in the compartments.

Figure 6:
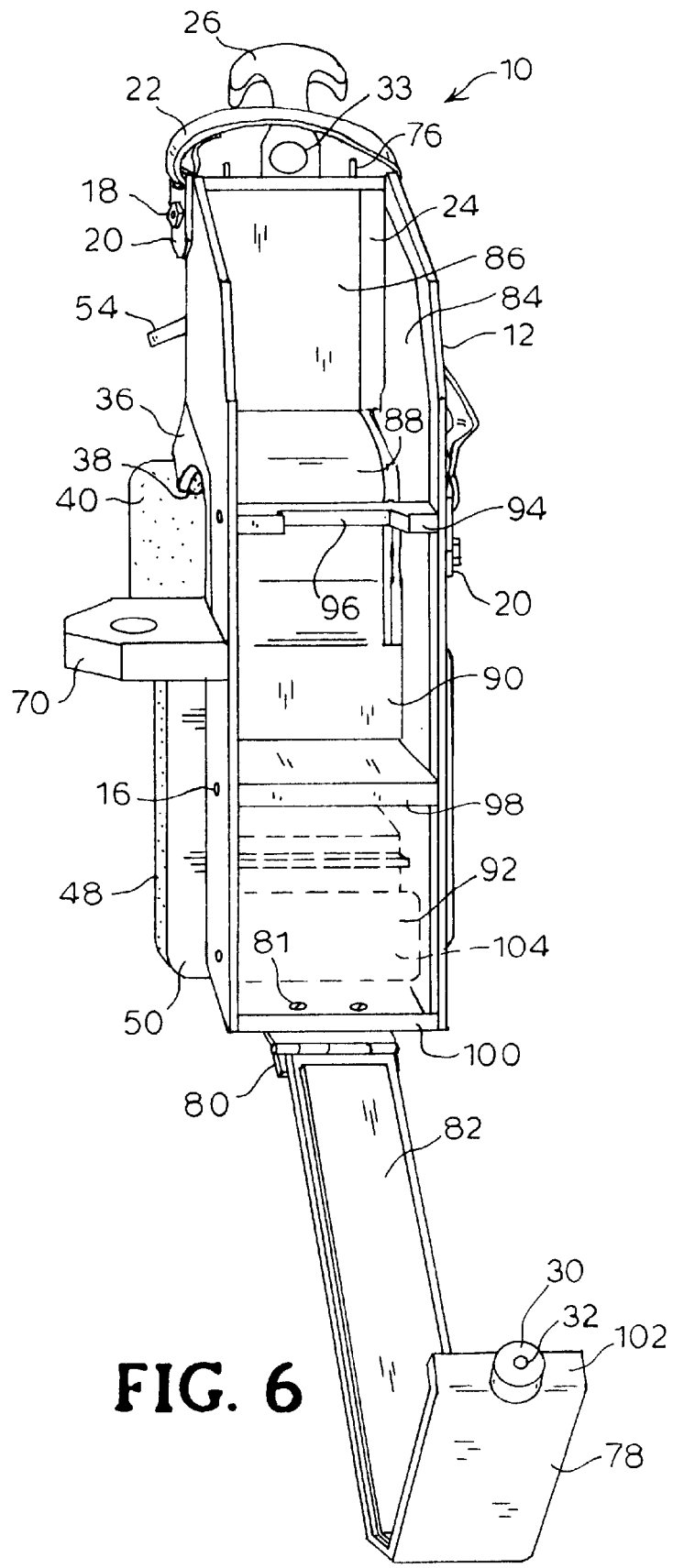
FIG. 6 is a perspective rear view of the shoulder platform of the invention with the compartment door open, showing the inner storage compartments.

When the support platform 10 is viewed from the back as shown in FIG. 6, a compartment is formed by the compartment front 24, frame 14 and sides 12. Within the compartment, there are thin pieces of compartment lining 84, preferably made of a fabric such as felt, affixed to each side 12.

Shelves, preferably a top shelf 94, middle shelf 98, and bottom shelf 100, formed of delron, are positioned at the top, central area, and bottom, respectively, of the compartment formed by compartment front 24, frame 14 and sides 12, and protrude toward the back of the support as shown in FIG. 6. Bottom shelf 100 forms the bottom of the compartment. Shelves 94, 98, 100 are attached to frame 14 with screws (not shown) and to sides 12 by screws 16. The shelves are equal in width so that they fit evenly and snugly between sides 12. In the preferred embodiment, middle shelf 98 and bottom shelf 100 are about 6.5 cm from front to back, about 7 cm wide, and about 0.7 cm thick, while top shelf 94 is the same width and thickness but is longer (about 8.5 cm) due to the increased depth of the compartment toward the top of the platform 10. The shelves extend outward from frame 14, with their front edge abutting the rear side of frame 14 and the back edge of each shelf not quite extending out to the back edge of sides 12.

With the shelves positioned within the platform 10, top shelf 94 forms a top storage compartment 86, which in addition to having the top of top shelf 94 on its floor, has an angled floor portion 88 of top compartment that is formed by the sloped frame 14. A floor lining 56 extends over the rear surface of compartment front 24 along the angled floor portion 88 of frame 14 that is within top compartment 86 and along the upper surface of top shelf 14. Between top shelf 94 and middle shelf 98 middle storage compartment 90 is formed, and between middle shelf 98 and bottom shelf 100 lower storage compartment 92 is formed. A variety of camera accessories, such as extra DV tapes, batteries, cables and battery packs 104 (the latter being shown in FIG. 6), may be placed in the storage compartments.

Compartment door 78 is preferably narrow (about 4 cm wide) and long as shown, extending from the bottom of lower storage compartment 92 to the top of compartment front 24 (about 38 cm long). Compartment door 78 is hinged by means of compartment door hinge 80, which is attached to compartment door 78 and to the bottom shelf 100 by means of hinge screws 81. A slightly narrower piece of compartment door lining 82, about 3.3 cm wide in the preferred embodiment and made preferably of felt, is glued to the inside of compartment door 78 to reduce the amount of sound of items made by the items contained in the compartment, and thus reduce microphone background noise. Compartment door 78 is bent to mirror the same shape as the upper shape of sides 12 as shown in FIG. 5 so that compartment door 78 fits up over the rearmost edge of the shelves and extends to the frontmost, upper corner of the sides 12. The width of compartment door 78 is preferably thin enough, e.g., about 4 cm wide, so that it can serve as belt-pack carrier (items which could be placed over a belt and worn on the waist, such as lens pack and wait pack, can be mounted on compartment door 78). Top shelf 94 preferably has a central cut-out area 96 as shown in FIG. 6 that is the width of compartment door 78, so that compartment door 78 fits snugly within the cut-out area 96 when compartment door 78 is closed, and does not move from side to side. In addition, although not required, there can be two alignment pins 76 extending upward at the top edge of compartment front 24 positioned so that compartment door 78 lies between pins 76 when it is closed (as shown in FIG. 6) or there can be a groove cut in the top of compartment front 24, as shown for central cut-out area 96 in top shelf 94. When compartment door 78 is closed, there is a gap of about 1.5 cm on each side of compartment door 78 (between each side of the door and the sides 12) so that belt loops on belt packs will fit over compartment door 78.

Figure 4:
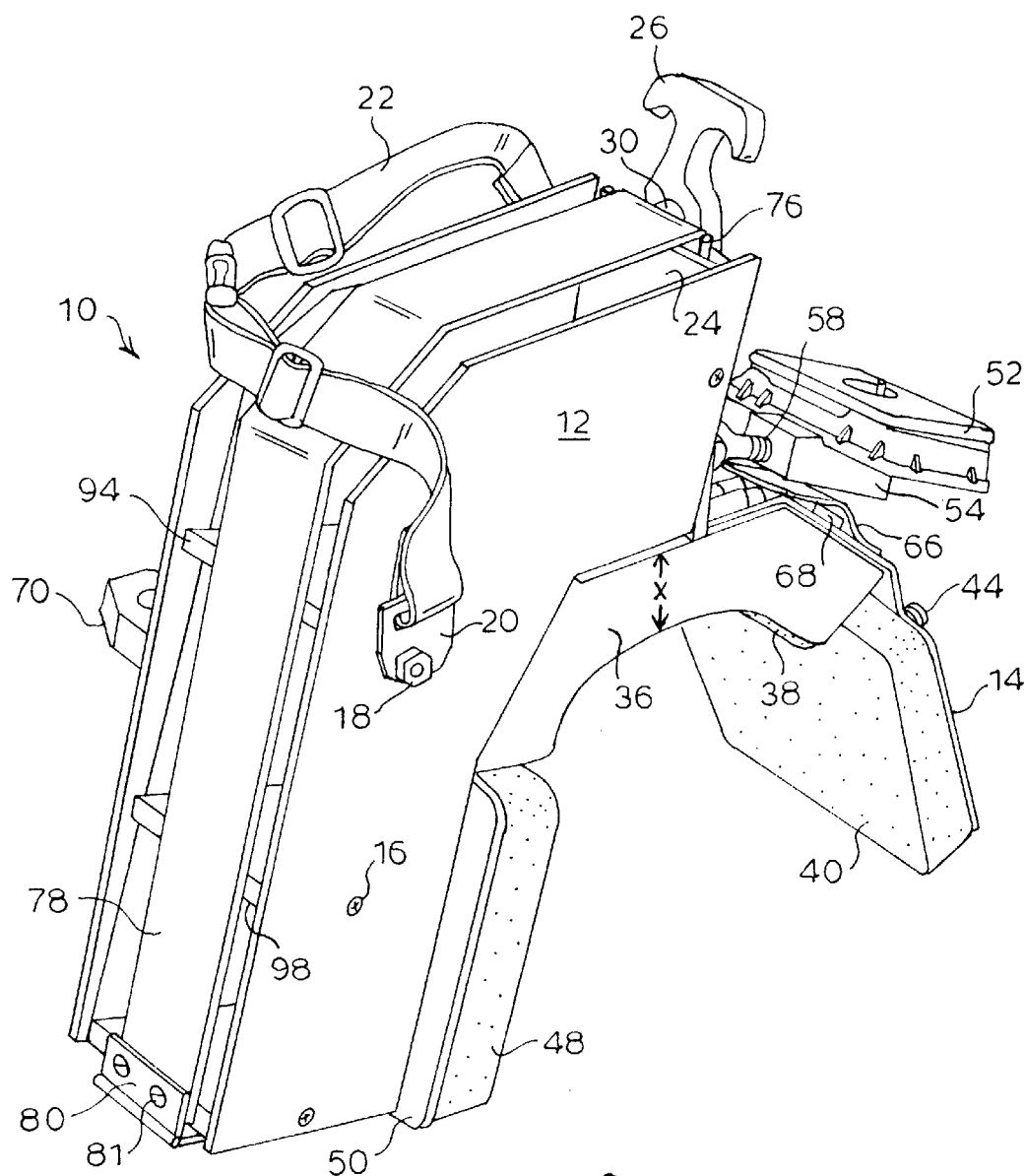
FIG. 4 is a perspective right rear view of the shoulder platform of the invention with the compartment door closed.
Figure 7:
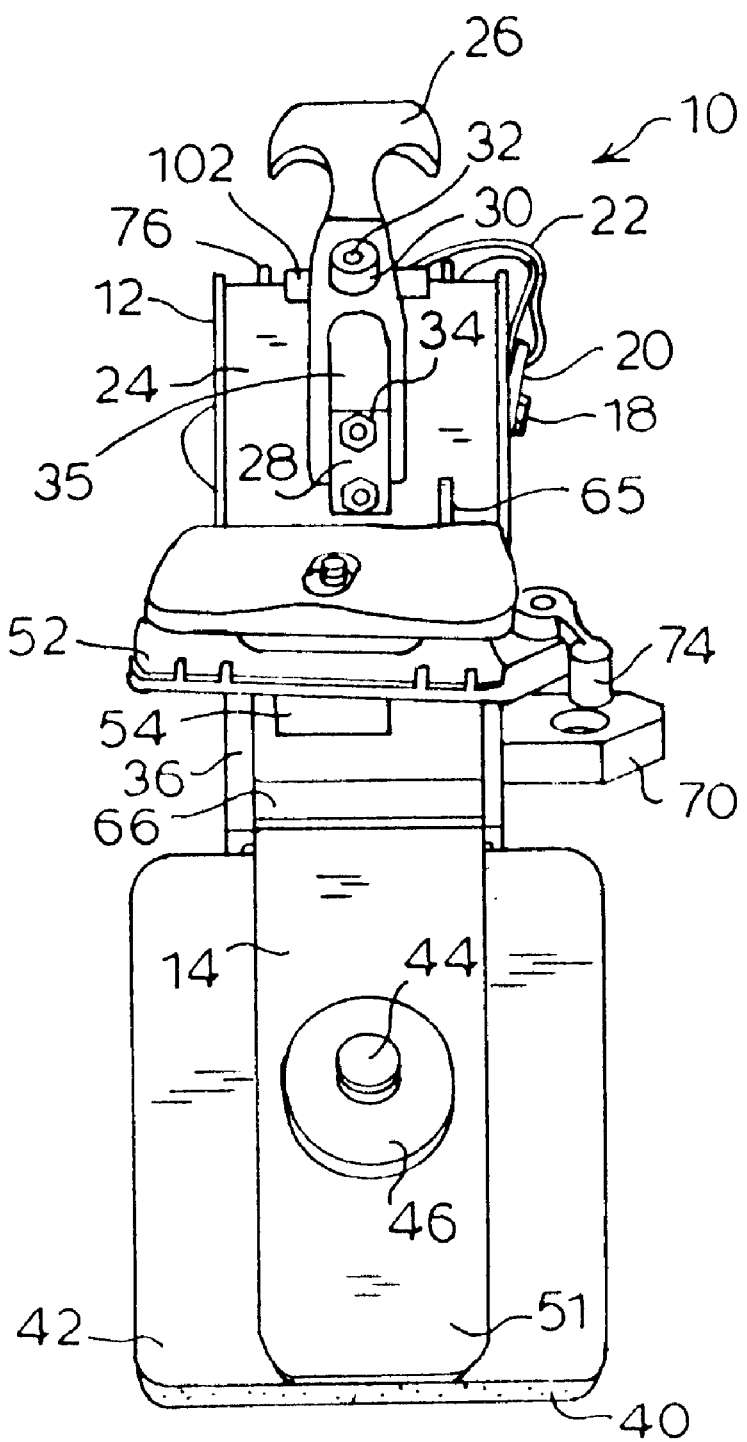
FIG. 7 is an elevational view of the front of the shoulder platform of the invention.

The distal end of compartment door 78 (the end farthest from the hinge 80) is bent over at an angle to form a lip 102 as shown in FIG. 5. A latch catch 30, which in the preferred embodiment is made of Teflon, is affixed to the lip 102 by means of screw 32 (a drywall screw is useful for this). Latch 26, which is preferably made of a stiff but flexible substance such as rubber, is mounted on to the front side of compartment front 24, has a hole 33 which slips snugly over latch catch 30 to hold door 78 closed. Latch 26 also has a lower elongated hole 35 so that latch mount piece 28 can be placed around the lower portion of latch 26 below the lower elongated hole 35 and then attached to compartment front 24 by means of latch mount screws 34 as shown in FIG. 7. This holds latch 26 to the compartment front 24, but allows rotation of the latch 26 outward within latch mount piece 28 to allow compartment door 78 to open. Also, the fact that latch 26 is somewhat flexible allows latch 26 to be pulled away from or pushed toward the compartment front 24 to release and open door 78, or shut and latch it, respectively. Although it is preferred for most uses to have the portion of latch 26 that extends above the latched compartment door 78 to be angled slightly toward the front of shoulder platform 10 as shown in FIG. 4, angling this portion of latch 26 toward the back is also possible, as shown in FIG. 1, if desired for particular purposes, such as to provide a cushion for the rear of the camera when tilting upward.

Figure 8:
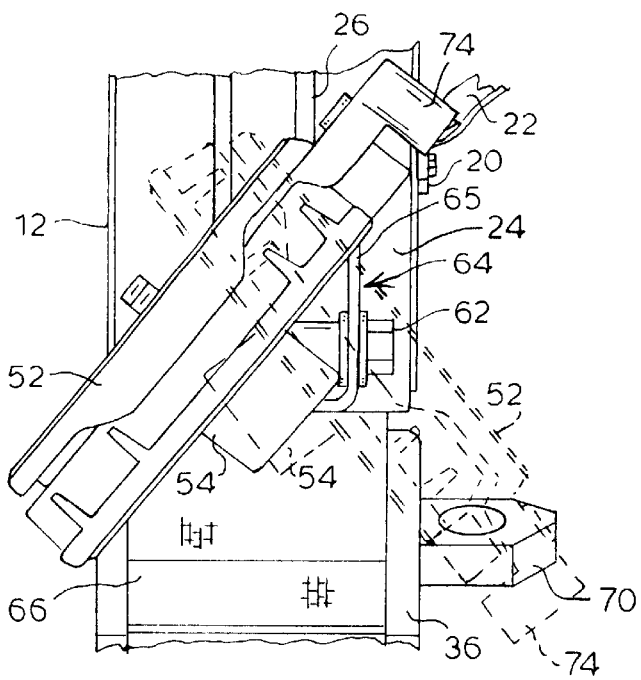
FIG. 8 is a front elevational view of the camera mount portion of the shoulder platform showing two movement options of the camera mount.
Figure 9:
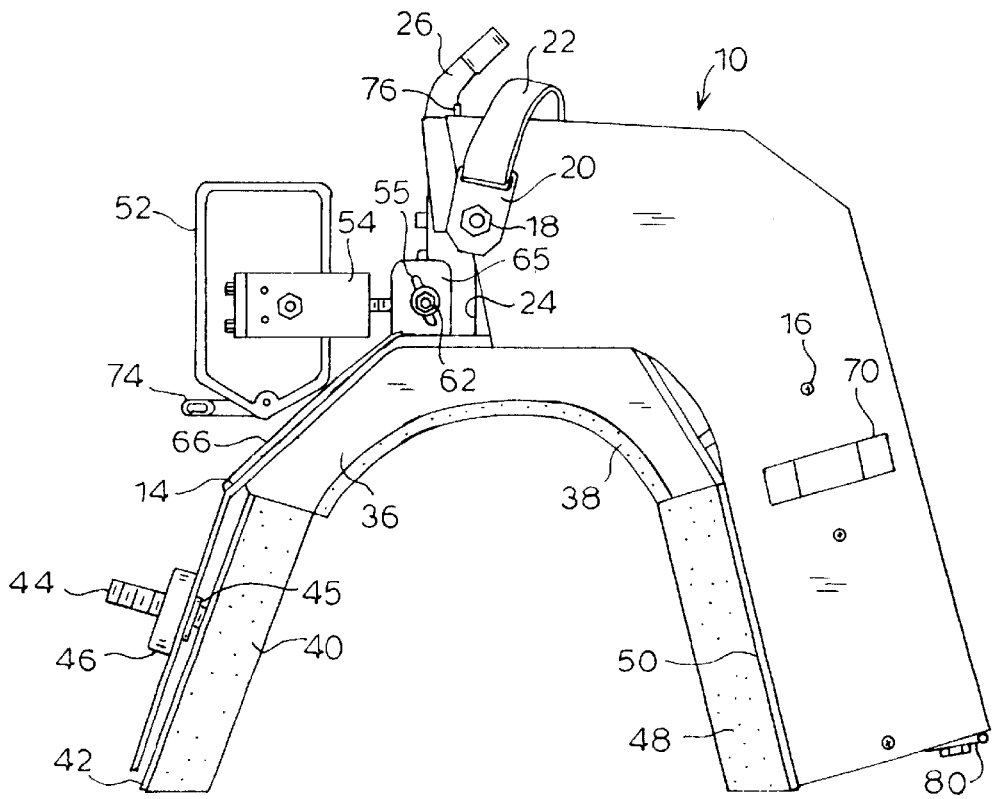
FIG. 9 is a left side elevational view of the camera mount portion of the shoulder platform showing a rotational movement option of the camera mount.

Shoulder platform 10 has a number of features that allow a camera mounted thereon to be moved into alternate shooting positions. The camera is mounted on shoulder platform 10 by means of a camera mount piece that comprises a standard quick release plate 52 and a gimbal block 54. The quick release plate 52 in turn comprises the camera plate itself (stays on the camera) and a quick release plate, having a release latch 74. The quick release plate is bolted on to gimbal block 54, which may be made of metal, such as aluminum. When gimbal block 54 is made, a threaded passage is cut in the back side of the gimbal block 54. A rod-end 58, shown in FIG. 11, having a hollow bearing end 57 and a threaded end 59, is threaded into the threaded passage. Turning gimbal block 54 on rod-end 58 allows the camera to be tilted to one side or the other, as shown in FIGS. 8–9 or up and down or from side to side. Note that in FIG. 9, quick release plate 52 is shown having camera release latch positioned on the right side of shoulder platform 10 and not the left side as shown in other figures; this choice may be made when the release plate is mounted on shoulder platform 10 prior to use of the invention.

Figure 10:
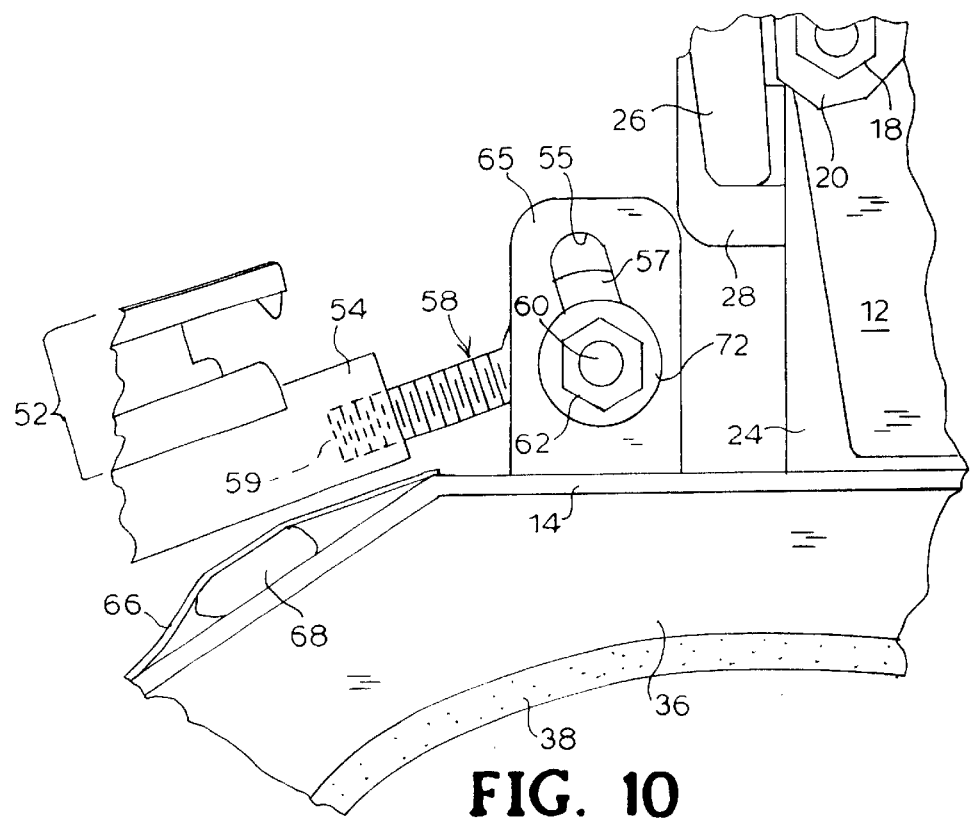
FIG. 10 is a left side elevational view of the camera mount portion of the shoulder platform.
Figure 11:
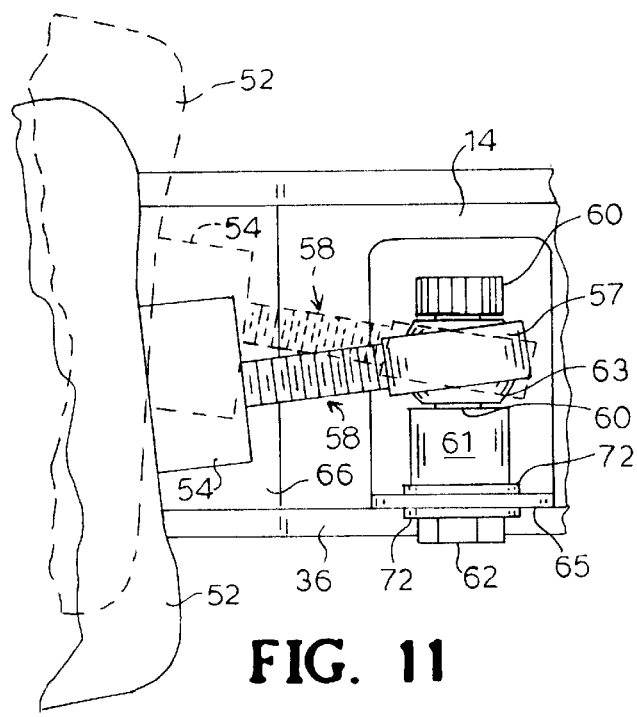
FIG. 11 is an upper plan view of the camera mount portion of the shoulder platform showing horizontal movement options of the camera mount portion, in addition to the horizontal movement allowed by the commercial camera mount plate.

An L-shaped adjustable gimbal anchor 64 having an upward portion 65 is attached to the top of frame 14. There is an elongated slot 55 in upward portion 65 of adjustable gimbal anchor 64 as shown in FIGS. 9–10. A shoulder bolt 60 (preferably a ⅜-inch Allen-head shoulder bolt) is bolted through the elongated slot 55. On shoulder bolt 60 is mounted the hollow bearing end 57 containing circular bearing piece 63. Shoulder bolt 60 and circular bearing piece 63 are held in position as shown by means of spacer 61, for example, a thick rubber washer located between circular bearing piece 63 and the upward portion 65, and washers 72 located between upward portion 65 and nut 62 on the left side of upward portion 65, and between upward portion 65 and spacer 61 on the right side of upward portion 65 (FIG. 11). The relative locations of the spacer 61 and the circular bearing piece on the shoulder bolt 60 may be reversed as desired by the operator prior to use of the shoulder platform so that the entire mounted camera is shifted sideways on the shoulder platform 10 for that use.

The camera and attached quick release plate 52 and gimbal block 54 may be lifted upward and/or moved slightly from side to side by moving hollow bearing end 58 around circular bearing piece 63 as shown in FIG. 11. To keep the gimbal block 54 from sliding back and forth too easily with respect to the shoulder platform, a gimbal ramp pad 66, made, for example, of rubber having a web-patterned nylon backing, is glued on frame 14 beneath the gimbal block 54. Although no longer part of the preferred embodiment, a pad 68, made may be placed beneath gimbal ramp pad 66 as shown in FIG. 10 to raise the level of the camera.

Microphone mount 70 is preferably attached to the left side of the shoulder platform 10 as shown in FIGS. 1, 4, and 6, and is preferably formed from a piece of delron that is about 1.5 cm thick that is attached to the left side 12 by means of two set screws (not shown) or other means known in the art. The size and shape of the microphone mount 70 are sufficient to allow it have a hole through it for secure placement of a microphone as shown in dashed lines in FIG. 1.

Figure 12:
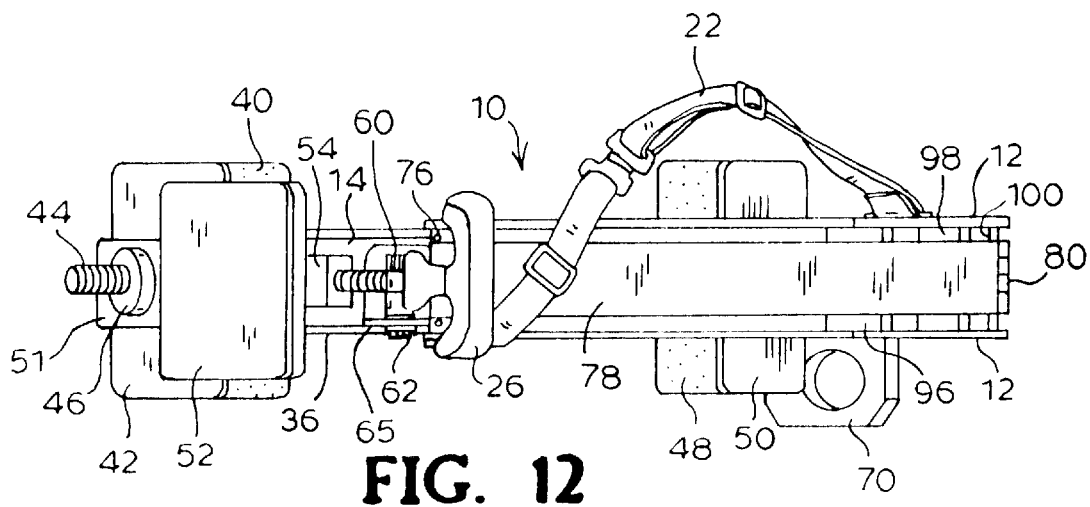
FIG. 12 is an upper plan view of the shoulder mount platform of the invention.

To allow the shoulder platform 10 to be more easily carried when it is not worn on the shoulder, it is preferably provided with at least one strap 22 as shown in FIGS. 4 and 12–13. In this preferred embodiment, the strap 22 comprises two half portions that are releasably attachable to each other by insertable latching means or other means as known in the art. Each half portion of the strap 22, which may be 6–7 inches or long or more, is attached to a side 12, such as by means of a strap mount 20 (shown in FIG. 4) and a strap attachment screw/washer assembly 18. Preferably one half portion is attached at the front left side of the platform and the other half is attached on the right side slightly lower toward the rear of the platform. With the weight of the camera on the shoulder platform 10, this provides balance of the center of gravity, for a more secure feeling when carrying the camera and platform, because having the straps mounted directly across from each other tends to result in the shoulder platform hanging at an undesirable tipped angle when suspended from the straps. The two half portions can be snapped together over the top of the shoulder platform 10 to allow the strap 22 to be used, or beneath the platform when not in use. The two half portions of the strap may be connected by means of a longer strap (not shown) attached between the two half portions, converting the strap from a carry handle to a shoulder strap.

While the invention has been described with reference to specific embodiments, it will be appreciated that numerous variations, modifications, and embodiments are possible, and accordingly, all such variations, modifications, and embodiments are to be regarded as being within the spirit and scope of the invention. For example, the support platform of the invention herein, while having its specific preferred embodiment, with particular dimensions designed to fit a particular video camera as described herein, may be modified appropriately to fit other cameras, particularly other bulky and/or unwieldy cameras, or for particular uses of the camera. Such modifications may be but are not limited to, for example, the means of attaching the camera to the support platform, the apportionment of relative weight to various portions of the platform to result in a balanced camera when mounted on the platform on a shoulder, and to variations for attachment of other accessories, for storage of components, or for ornamental or other variations for providing a platform that has a particular appearance.

What is claimed is:

1. A shoulder platform for supporting a camera, comprising:
   a) an elongated bent frame having sides and extending from a back support portion to a lower front end, said frame having a back shoulder pad mounted on the back support portion and a front shoulder pad adjustably mounted at the lower front end;
   b) a shoulder mount affixed below the frame between the back support portion and lower front end, said shoulder mount having a shoulder brace cushion pad attached below the shoulder mount;
   c) a compartment front, mounted on the frame above the shoulder mount, two sides mounted above and along the sides of the frame, and a plurality of shelves mounted between the sides, which together with the frame form a plurality of storage compartments;
   d) a latch mechanism mounted on the compartment front;
   e) an elongated compartment door having an upper latch catch, said elongated compartment door hingedly attached to a lowest shelf of the plurality of shelves, said compartment door being sufficiently long so that the upper latch catch may be releasably latched to the latch mechanism; and
   f) a camera mount piece attached to the frame so that the supported camera mounted on the camera mount piece may be placed in a plurality of positions for photographing subject matter.

2. The shoulder platform according to claim 1, wherein the plurality of shelves comprises a top shelf that has a central cut-out area in which the compartment door rests when the compartment door is latched to the latch mechanism.

3. The shoulder platform according to claim 1, further comprising a means of aligning the compartment door when the compartment door is latched to the latch mechanism.

4. The shoulder platform according to claim 1, wherein there are three shelves.

5. The shoulder platform according to claim 1, further comprising a microphone mount on one of the sides.

6. The shoulder platform according to claim 1, wherein the supported camera mounted on the camera mount piece may be placed in a plurality of positions for photographing subject matter, utilizing a rod-end comprising a circular bearing piece mounted on the frame.

7. The shoulder platform according to claim 1, wherein the front shoulder pad is affixed to a chest support plate which is adjustably mounted on the lower front end so that the chest support plate and the front shoulder pad may be moved toward or away from the back support portion.

8. The shoulder platform according to claim 7, wherein the chest support plate is adjustably mounted by means of an adjuster stud and plate adjuster so that turning plate adjuster causes the chest support plate to move.

* * * * *